United States Patent [19]

Schiff et al.

[11] Patent Number: 4,464,678

[45] Date of Patent: Aug. 7, 1984

[54] TIME WINDOW KEY SYSTEM FOR VIDEO SCRAMBLING

[75] Inventors: Leonard N. Schiff, Lawrenceville; Smith Freeman, Skillman, both of N.J.

[73] Assignee: RCA Corporation, New York, N.Y.

[21] Appl. No.: 341,499

[22] Filed: Jan. 21, 1982

[51] Int. Cl.[3] .................. H04N 7/16; H04K 1/04
[52] U.S. Cl. ........................... 358/122; 340/825.34; 358/117; 358/123; 358/124
[58] Field of Search ............... 358/117, 122, 123, 124; 340/825.34

[56] References Cited

U.S. PATENT DOCUMENTS

Re. 28,701  1/1976  Edwards et al. .............. 235/381
4,081,832  3/1978  Sherman ........................ 358/124
4,225,884  9/1980  Block et al. ................... 358/124
4,430,669  2/1984  Cheung ......................... 358/122

Primary Examiner—S. C. Buczinski
Attorney, Agent, or Firm—E. M. Whitacre; W. H. Meise; H. I. Steckler

[57] ABSTRACT

A video scrambling device requires that a key signal be periodically inserted into a subscribers box, e.g. once a month. The key signal is a function of both the box number and the time, and thus once received must be inserted relatively quickly, e.g. an hour or two. If it is not inserted quickly, a new key signal must be obtained. This makes it extremely difficult for a pirate to distribute a key signal to his customers in time for it to be effective. The scrambling method can be pseudorandom line inversion and also audio scrambling.

4 Claims, 5 Drawing Figures

TIME WINDOW KEY SYSTEM FOR VIDEO SCRAMBLING

BACKGROUND OF THE INVENTION

The present invention relates to video scrambling systems, and more particularly, to such systems that have a high degree of security.

There are various systems of scrambing a video signal for subscription television (STV) services. The only system type currently in widespread use is the so-called "fixed" system. No input from the user or operator of the system is ever needed. A simple fixed system can send the sync (synchronization) signal at a level of, e.g. 10 db less than normal, whereby a receiver unequipped with an unscrambler cannot "lock up" onto the signal, and therefore no intelligible picture can be observed. More complicated fixed systems also scramble the audio signal. While fixed systems differ in how complex the descrambling is, the box that the scheme is built around (that does the descrambling) is something that, once in a person's possession, enables him to receive the programming indefinitely. Regardless of how complicated the box is, a person can obtain and manufacture copies of it. This enables him to illegitimately go into the business and compete with the legitimate source. In fact, it is not even necessary for this person ("pirate") to understand how the box works. All he has to do is be able to manufacture copies of the box. Further, even if no thief sets up in the business of manufacturing boxes, there can be a thriving market in selling stolen boxes which are obtained as a result of burglaries or hijacking.

Another system is called a "keyed" system. A keyed system requires a periodic input, e.g. each month, for proper functioning. This "key" supplied to the box can be an optically coded piece of paper, a magnetically encoded card, or a sequence of numbers punched on a key pad. The key is different each month and the key for one subscriber is different than the key for all others. Without the key insertion, a receiver enable circuit will not produce the proper digital code stream for descrambling. One type of scrambling suitable for use with a keyed system is a random inversion method. This method changes the sign of the modulation sense of the TV signal every line on a pseudorandom basis. A pseudorandom bit stream matching the one which modulates the transmitted signal is generated by the enable circuit of the receiver upon insertion of the proper key. This is used to unscramble the received signal. By its very nature the code can be changed periodically and that is a common feature of all keyed systems. Another method that is suitable for a keyed system, is a line permutation system in which, at the transmit end, a group of lines are stored and sent out in pseudorandom order. A code is necessary to put them back in the right order and that code is generated in the enable circuit by the proper key being given to the descrambler box. Yet another kind of method suitable for a keyed system is one in which each of the TV lines is broken at a pseudorandom point in the middle of the line and the two portions of the line are now sent out in opposite order. The breakpoint of the line is at a different point for each line and again the key for the code is necessary for the descrambler to be able to know where that breakpoint is. There are some problems with this latter method in that the breakpoint tends to show up as an artifact in the received picture. For any of these keyed systems, the pirate may be able to obtain a key and distribute to his customers. This can be done at a relatively slow pace, since the legitimate provider must start distribution of the key to legitimate customers at least a few days before the key changes.

It is therefore desirable to provide a keyed scrambling system for a video signal in a manner that provides a high degree of security against unauthorized descrambling.

SUMMARY OF THE INVENTION

Method and apparatus for decoding a scrambled signal, comprising applying to a decoder a key signal during a first period, accepting said key signal only during said first period, and permitting decoding during a second period longer than said first period.

DETAILED DESCRIPTION

Figure 1:
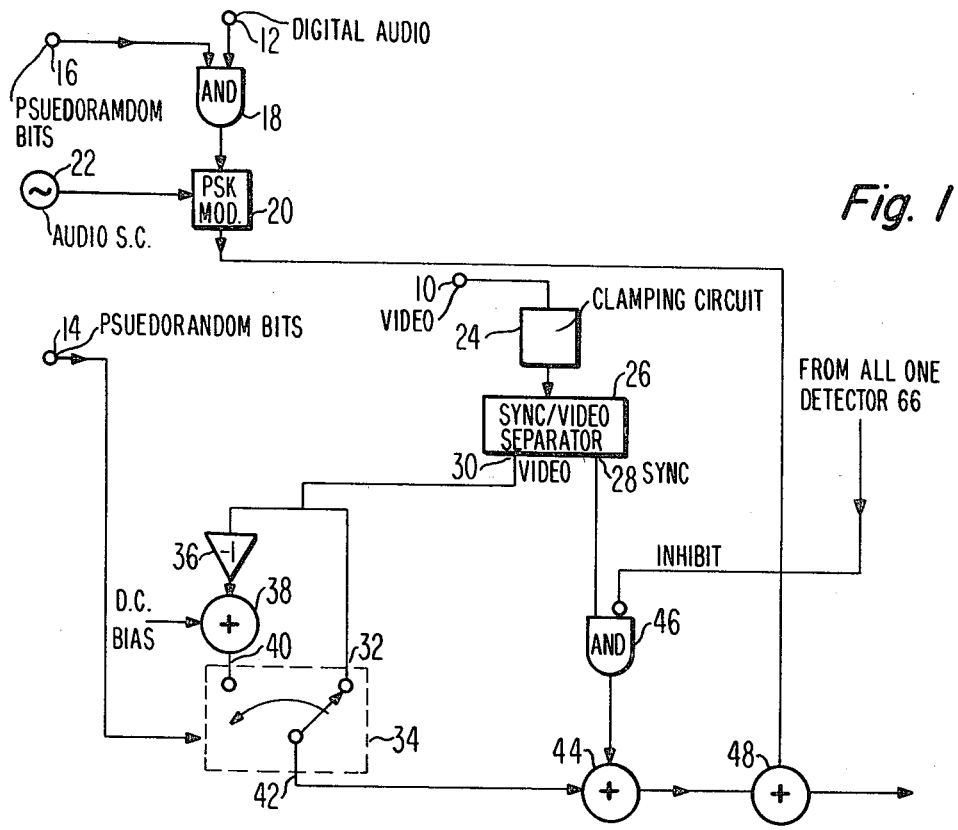
FIG. 1 is a block diagram of a scrambler for use with the present invention.

FIG. 1 shows a transmitter scrambling apparatus. Input 10 in the middle of FIG. 1 receives a conventional NTSC video source, which is AC coupled, and a digital audio source is received at input 12 at the top of FIG. 1. The digital audio source is, for example, a PCM input with two samples per TV line, 8 bits per sample, making a digital data stream of 240 kilobits per second. The digital audio is carried on a subcarrier and the video signal plus modulated subcarrier, which comprises the output signal from adder 48 at the lower right, are FM-modulated and transmitted to a satellite. The scrambler of FIG. 1, in addition to receiving the signal from the video source and the digital audio baseband signal, also receives two pseudorandom digital data streams at inputs 14 and 16 at the left of FIG. 1. These are different pseudorandom bit streams, but they are bit-synchronized together. They are both synchronized to the line rate of the TV signal which is approximately 15.734 kHz (hereinafter 15 kHz) for NTSC color signals.

The audio scrambling apparatus is shown at the top of the figure. The digital audio stream at input 12 is applied to AND gate 18 together with the pseudorandom data stream at input 16 to produce a scrambled baseband digital audio signal. They are logically ANDed together and the resulting signal applied to PSk modulator 20, which modulator 20 also receives an audio subcarrier signal from generator 22. The subcarrier frequency is above the highest frequency of the video baseband (that is, greater than 4.2 MHz for NTSC). The output of PSK modulator 20 is therefore a subcarrier signal that is PSK-modulated by the scrambled digital audio.

Figure 2:
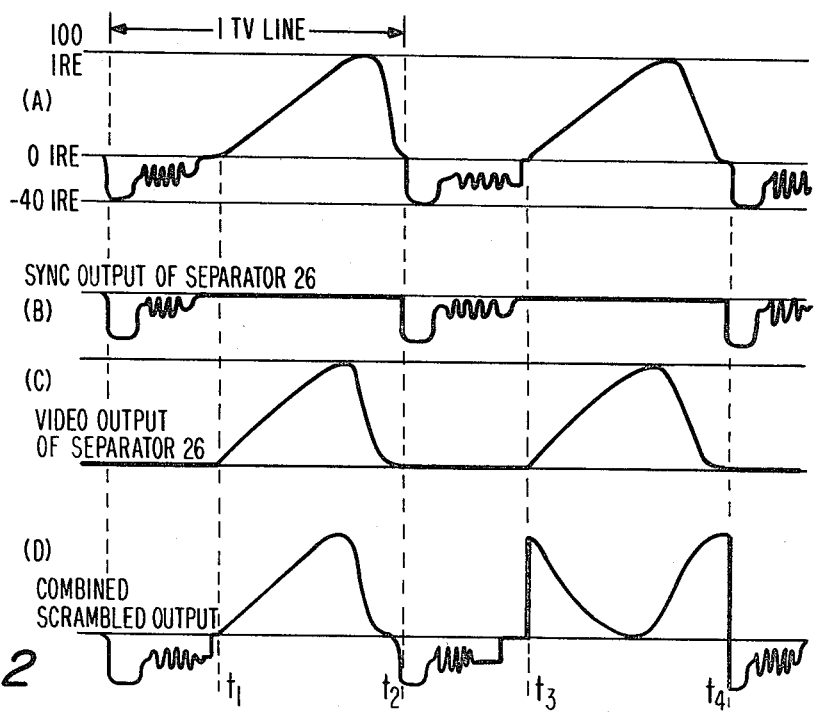
FIG. 2 shows waveforms occurring in FIG. 1.

The AC-coupled video signal at input 10 is clamped by clamping circuit 24 as its first processing operation. The clamping operation is necessary because the scrambling necessitates use of signals referenced to a DC level. The clamped video signal is then applied to a sync/video separator 26, the purpose of which is to strip off the sync from the video signal. The appropriate waveforms are shown in FIG. 2. FIG. 2A shows the clamped video signal as it enters sync video separator 26. The sync signal output 28 of the separator provides only the synchronization signals shown in FIG. 2B. The video signal from output 30 is shown in FIG. 2C. It contains only the video information and the sync information has been stripped off. This resultant video signal then is applied to two parallel paths—one which just applies the signal to input 32 of switch 34 and the other path multiplies the signal by −1 using inverter 36 and then adds a DC bias using adder 38. The thus inverted and biased signal is applied to input 40 of switch 34. The pseudorandom stream at input 14 operates in synchronism with the TV line and controls the electronic toggle switch 34 which selects between either the inverted TV signal or the normal polarity TV signal. Hence, the output signal from output 42 of the switch 34 is sometimes the normal TV information and sometimes the inverted TV information, according to whether the pseudorandom bit for that particular line was a logical 0 or 1.

Sync information from output 29 is then normally added by adder 44 to the scrambled TV information from output 42. A typical output signal from adder 44 is shown in FIG. 2D. It shows a waveform in which the first line of information from $t_1$ to $t_2$ has the normal polarity and the second line of information from $t_3$ to $t_4$ has been inverted. As stated above, sync is normally added back to the scrambled video to produce the output signal from adder 44. The one exception is that every few seconds an input signal arrives from all one detector 66 (to be described below in conjunction with FIG. 3) and is applied to inhibit gate 46 (an AND gate with an inverting input). This input signal inhibits the sync from being added to the scrambled video. No sync is added for that one line which occurs every few seconds. The result is that the output signal from adder 44 almost always has the sync information except for one line every few seconds. The scrambled video information with sync normally reinserted has the modulated audio subcarrier added to it by adder 48 and the resulting signal is fed to a conventional FM modulator (not shown) which transmits its signal to the satellite. The satellite amplifies the signal and transmits it back to the DBS (direct broadcast satellite) receive stations scattered over its coverage area.

Figure 3:
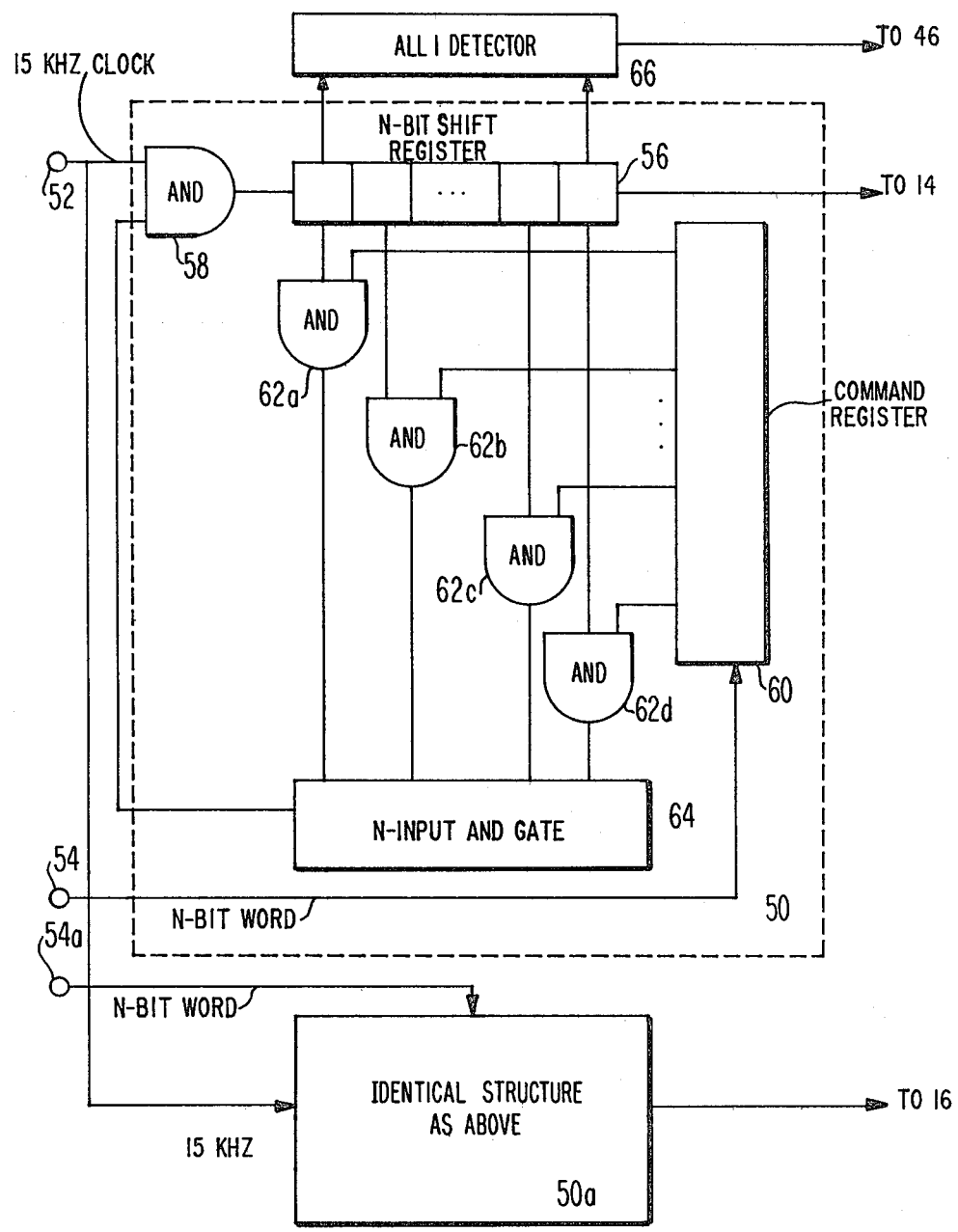
FIG. 3 is a block diagram of scrambling sequence generators used with the scrambler of FIG. 1.

FIG. 3 shows a block diagram of the circuit for generating the scrambling sequences used in FIG. 1 at the transmitter. There are actually two distinct scrambling sequence generators 50 and 50a shown in FIG. 3. Both operate in synchronism at the line rate of about 15 kHz and are driven by a 15 kHz line rate clock (for NTSC) applied to input 52, which is ultimately derived from the sync information, or from a common source with the sync information. The second generator 50a is identical with the first generator 50, and therefore, its circuit details are not repeated. Aside from the 15 kHz clock being applied to the scrambling sequence generators 50 and 50a, the required inputs are two different N-bit words respectively introduced into the generators once every hour from inputs 54 and 54a. One N-bit word is associated with generator 50 used for scrambling video. The other N-bit word is associated with generator 50a used for generating the pseudorandom bit stream for scrambling the audio information. Both N-bit words are supplied once per hour; both are generated by computer software in accordance with the random pattern to be used for the next hour of scrambling. The operation of generator 50 is described, the operation of generator 50a being identical.

The sequence generator 50 has the architecture of a conventional pseudorandom noise generator and comprises an N-bit shift register 56 with an input signal supplied from AND gate 58. The N-bit word that controls the scrambling sequence for the next hour is entered in command register 60 from input 54. Each bit (storage cell) of command register 60 respectively controls one gate 62a through 62d respectively coupled to storage elements of the N-bit shift register 56. (Only four gates are shown, there are actually N gates). If a particular command register bit is a logical zero, the respective gate 62 is inactivated (does not let signal pass); if the bit is a logical one, the respective gate is activated (lets signal pass). The bits from N-bit shift register 56 coming through gates 62 that are activated (as controlled by command register 60) are ANDed together in N-input AND gate 64. The output of gate 64 is fed back to gate 58 controlling the input to N-bit shift register 56. Gate 58 also receives the clock signal in coincidence with the output signal of N-input AND gate 64 and the AND of these signals determines the next state of the least significant bit of N-bit shift register 56. The theory of these pseudorandom noise shift register structures is well understood. A book by W. W. Peterson, called "Error Correcting Codes" contains a description in Chapter 7 of the theory of operation of these devices. Briefly, the nature of these logical feedback structures is as follows.

Depending upon the word in command register 60, the output signal sequence (which output signal can be taken from the last cell of the shift register 56 as shown in FIG. 3) will have different periodicities. For a large number of N-bit words (listed in appendix C of said book) in command register 60, the output will have a periodicity of $2^N - 1$, where N is the length of shift register 56. In those cases the result is called a maximum length shift register sequence. For other words in command register 60, the output will repeat after a number of bits which is less than or equal to $2^N - 1$. The output may still appear random looking even if the sequence is not maximum length. For certain words in command register 60 the output will be periodic with a very short period and that is undesirable. In other words, N-bit words will be inserted into command register 60 such that the period of the output digital sequence will be very long. All of the N-bit words corresponding to maximum length sequences will eventually be used and some of those corresponding to less than maximum length may also be used. The only proviso is that all words used must be such that at one point in time the contents of the shift register must be all ones. All the maximum length sequences have this property and certain non-maximum length sequences have this property as well. Hence, upon application of the proper N-bit word, a logical sequence of ones and zeros at about a 15 kHz rate emerges from N-bit shift register 56. This sequence is random looking and has a very long repeat length. N will be chosen sufficiently large so that the sequence repeats after a number of seconds. The reason why the code repeats after only a few seconds is to shorten the time to achieve synchronization at the descrambler. At the end of an hour a new word from AND gate 64 and a new random looking sequence starts to be generated which is random looking, but different than the original sequence. The purpose of changing the code every hour is that if a pirate is trying to unscramble the signal, and if he manages to unscramble it after a sufficiently long time it will just change on him an hour later. In other words, it allows him only a short time to try to break the code.

As mentioned above, the N-bit words that are fed into command register 60 are such that eventually in the sequence all ones will appear in N-bit shift register 56. When an all-one condition arises, all-one detector 66 (N-input AND gate) coupled to shift register 56 will emit a pulse. This pulse is fed to the scrambler circuit of FIG. 1, specifically to inhibit gate 46, and acts as the inhibit mechanism described in conjunction with FIG. 1 that keeps the sync from being transmitted for that line. This is for purpose of re-synchronizing at the descrambler described below. The omitted sync signal informs the descrambler that the all one condition exists in shift register 56, thereby providing a synchronization time point.

Figure 4:
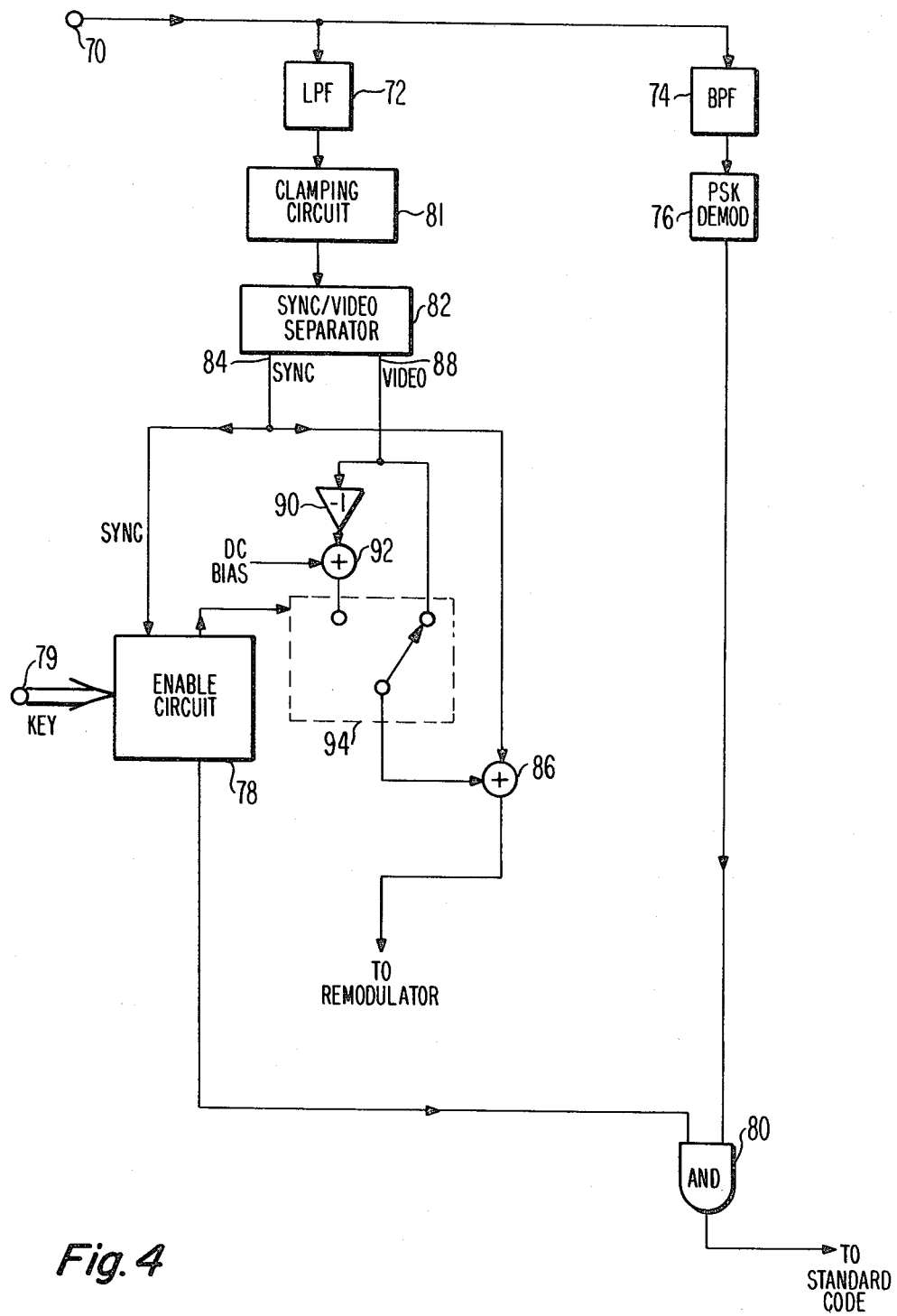
FIG. 4 is a block diagram of a descrambler in accordance with the present invention.

FIG. 4 is a block diagram of the receiver descrambler, which is located at the customer's premises. Input 70 of the descrambler is derived from the output of the customer's conventional FM demodulator (not shown), which is part of his satellite-television signal converter receiver. The signal at input 70 is a baseband signal containing the scrambled video information occupying the spectrum from zero to 4.2 mHz and an audio subcarrier that is PSK-modulated by the scrambled audio sequence. The signal from the demodulator (not shown) is filtered by low-pass filter 72, which provides the video information, and is also filtered by band-pass filter 74 to extract the modulated audio subcarrier. The audio unscramble sequence at 15 kilobits per second is provided by enable circuit 78 (to be described below in conjunction with FIG. 5). The audio unscramble sequence is identical to the sequence generated at the transmitter; as a result, when the scrambled audio and the audio unscramble sequence are applied to AND gate 80, the output from gate 80 is the unscrambled digital audio information which is then inserted into a standard digital-to-analog converter (not shown) to produce the analog audio information. It will be recognized that the audio descrambling operation is essentially a mirror image of the scrambling operation.

Likewise, the video processing at the descrambler is essentially the mirror image of the video scrambling performed at the transmitter. The low-passed filtered video information from the output of filter 72 is clamped by clamping circuit 81 because the DC level must be preserved. The clamped video signal output signal from clamping circuit 81 is applied to a sync/video separator 82 just as in the transmitter. The sync information from separator output 84 is applied to enable circuit 78 and to adder 86. The video output signal at output 88 is applied to the same kind of two-path structure as in the transmitter, one path inverting the video information using inverter 90 and adding an offset bias using adder 92, the other path preserving the video information in its uninverted and unbiased form. Enable circuit 78 provides a video unscrambling sequence signal as a control signal to alternate electronic toggle switch 94 between the two paths. The output signal of switch 94 is the unscrambled video information. That is, electronic toggle switch 94 jumps back and forth between the two paths once per line in accord with the unscramble sequence that allows it to select the proper polarity for that particular video line. The sync information is added by adder 86 to the output signal of switch 94, which adding produces a conventional baseband unscrambled video with proper sync reinserted. This is a normal baseband video signal. The video signal output from adder 86 is applied to a conventional video remodulator (not shown) which modulates the baseband video onto a standard TV channel for carrier application to the tuner (not shown) of a television set. The key to proper operation of the descrambler, then, is enable circuit 78 shown in the left-hand portion of FIG. 4. Enable circuit 78 receives one input signal from the signal received from the satellite, that is the sync information. In turn, it provides to the descrambling circuitry, a sequence to unscramble the audio and a sequence to unscramble the video. The only other input of enable circuit 78, namely input 79, comes from key insertion, which is described below.

Figure 5:
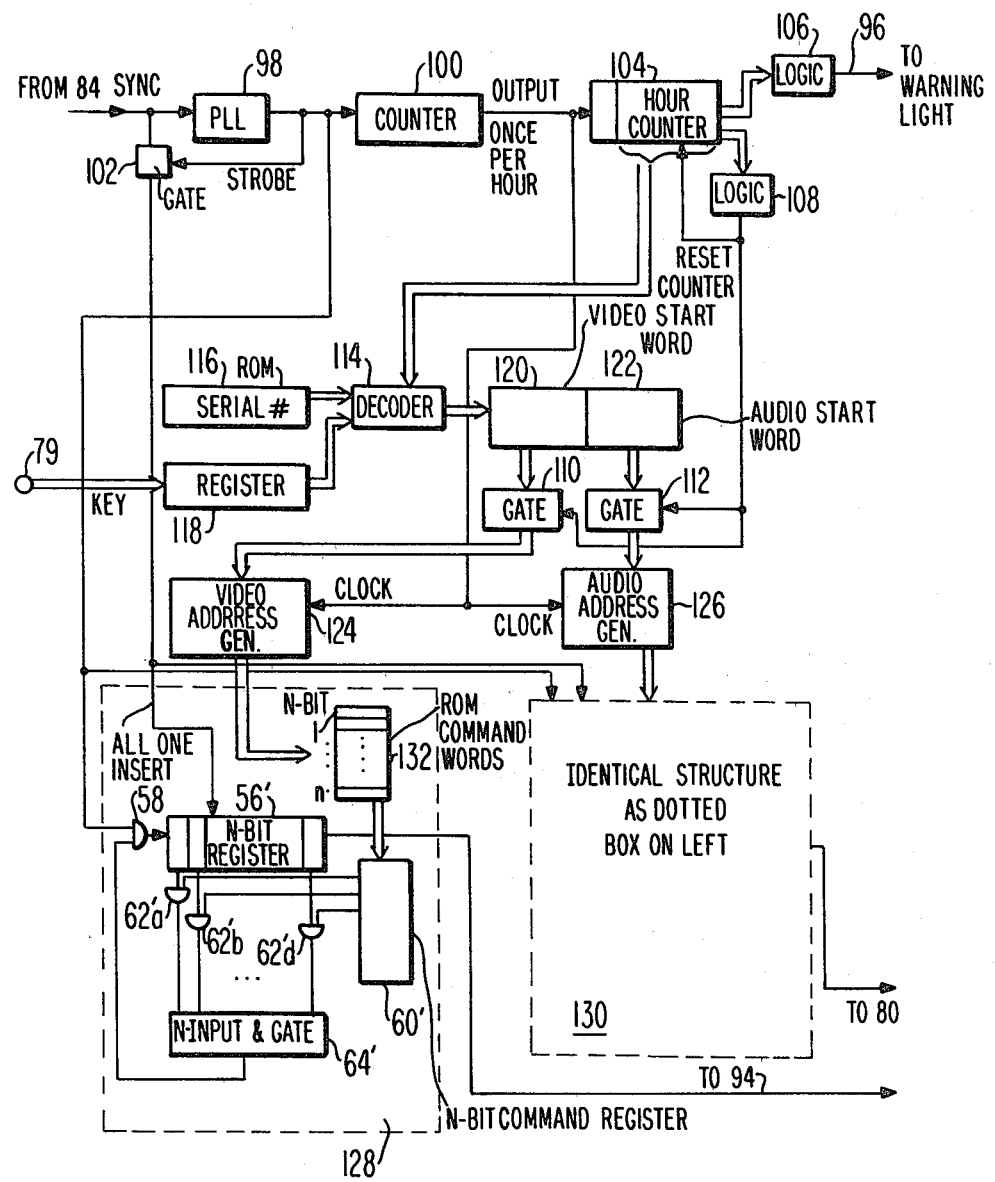
FIG. 5 is a block diagram of an enable circuit for use with the descrambler of FIG. 4.

FIG. 5 is a block diagram of enable circuit 78 which is the heart of the whole system operation. As shown in FIG. 4, the enable circuit gets two input signals. One (shown at the top left of FIG. 5) is sync information from separator output 84, the other (shown at the middle left) is the keyed-in information at input 79, which is obtained quasi-periodically from the customer. The two outputs of the box mentioned in conjunction with FIG. 4, the audio and video unscramble sequences, are shown as outputs in the lower right of FIG. 5. In addition, one other output 96 from enable circuit 78 is shown at the upper right. This output provides a signal to drive a warning light (not shown). The purpose of the warning light is to alert the customer that he needs to key in new information to his descrambler.

The functions of the circuitry at the top part of FIG. 5 will be described first. The sync signal coming from the sync/video separator output 84 is applied to phase-lock loop 98. Phase-lock loop (PLL) 98 operates as a "flywheel" to provide a steady synchronization pulse train at its output. Because the sync signal is omitted every few seconds, the flywheel action of phase-lock loop 98 is necessary to provide a steady output signal. Also, interference or momentary outages of the signal from the satellite may cause suppression of sync pulses coming into the box and again phase-lock loop 98 flywheels through these periods. The output of phase-lock loop 98 is applied to counter 100. In addition, the output of phase-lock loop 98 is fed back to exclusive-OR gate 102 as a strobe signal to strobe the input sync signal. The purpose of this is to detect the sync pulse which is missing. When the input sync is missing, the output of phase-lock loop 98 will still produce a sync pulse through the flywheel action, and the fact that the strobe pulse is present during the sync absent interval will cause a pulse at the output of gate 102 labelled "missing sync detector". This is used for purposes of synchronization (described below). Counter 100 counts pulses and emits an output pulse and resets itself once every hour. This corresponds to the time during which the scrambling sequence will be changed. The output of counter 100 which has a pulse occurring every hour, is applied to another counter 104 called the "hour counter". Hour counter 104, in turn, has three different outputs. One output is applied to logic circuitry 106 that drives the warning light, another goes to logic circuit 108, the last one goes to decoder circuit 114.

The operation of the logic circuitry to drive the warning light is now described. When hour counter 104 has reached or exceeded a count of given value, and the least significant bit is a zero, logic circuit 106 will turn the warning light on. The count corresponds to the number of hours in a period such as three weeks (in other words, a period almost a month long). This is to give the customer ample warning time. Only if the least significant bit is a zero will the warning light be driven on. Hence, the operation of the warning light to a customer is about like this: Sometime about three weeks after the start of the new month or one week before the start of the new month for change of code, the warning light would come on at say five o'clock. It would stay on until six o'clock and at six o'clock, it would go off (i.e., six o'clock would correspond to a time where the least significant bit is one). The warning light would stay off from six to seven, but would come on again from seven to eight and then go off again from eight through nine, etc. A person is only to secure his new key information for the descrambler while the warning light is on.

The second output of hour counter 104 drives logic circuitry 108 to count till the end of the month. In other words, logic circuitry 108 compares the contents of hour counter 104 against a preset count stored in 108. When the hour count reaches the pre-set limit, circuit 108 transmits a pulse to gates 110 and 112. This pulse also resets hour counter 104. Hence, circuitry 108 detects when the end of the month has occurred and gates signals to start the generation of a new code for the coming month as explained more fully below.

The final use of hour counter 104 is to drive decoder circuit 114 for the system. The center section of FIG. 5 shows the inputs to decoder 114. One input to decoder 114 is the customer serial number, which is available to decoder 114 at all times because the information is permanently stored in ROM 116. A second information available to decoder 114 is the most recently keyed information by the customer. Whenever the customer keys in new information from, e.g. a touch pad (not shown) coupled to input 79, the information is stored in register 118 shown as the termination of key input 79. The output of hour counter 104 minus its least significant bit is a third input to decoder 114. The result of these three inputs produces the video start-word and the audio start-word, which are respectively stored in registers 120 and 122. The least significant bit of hour counter 104 is not included in the hour information because this gives the customer an hour's grace to enter the key information into the system. In other words, if the timing light were on from five until six o'clock, and the customer noticed it at almost six o'clock and received his key information from the central source even after six o'clock and entered in into register 118, the enable circuit of FIG. 5 would still work properly even if he entered it anytime up to seven o'clock. This is because the decoding circuitry cannot tell the difference between a time between five and six and between six and seven respectively, because the least significant bit is not part of the information put into decoder 114. The decoding algorithms in decoder 114 could be any of a number of different types. The important requirement is that the word from hour counter 104, the word from the customer serial numer in ROM 116, and the word from register 118 together determine a unique pair of words, the video start-word and the audio-start word.

The way the system operates is that when the customer asks for a new key, e.g. by way of the telephone, from the central computer, the central computer has stored the customer serial number, and it knows the hour at which he has asked for the information and will supply the customer a key to put into his register 118 such that decoder 114 will decode these three pieces of information to produce the two start-words of exactly the kind that the central computer computes are needed. The computer works backwards by having stored which video and audio start-words it wants to produce in the customer box.

The decoding algorithm can use either combinational logic or sequential logic and there are any number of ways of doing the decoding operations. As soon as the key is entered into register 118, the decoding by decoder 114 takes place immediately and the video start-word and the audio start-word are stored in their respective registers 120 and 122. However, the start-words are not immediately used. Logic circuit 108 which determines when the end of the month has occurred, will open gates 110 and 112 respectively, associated with the video and audio start-words and at that moment those words are jammed into video and audio address generators 124 and 126 respectively. Generators 124 and 126 each comprise maximum length shift registers of the type already discussed above. The clock which drives shift registers 124 and 126 is simply the output of counter 100, and hence, the address contents of generators 124 and 126 changes once per hour. The actual sequence of the addresses produced, however, depends on what word is set into them at the start of the month.

The bottom portion of FIG. 5 shows how the inputs of address generators 124 and 126 are used to produce the actual video and audio unscramble sequences. Since video and audio sequence generators 128 and 130 are identical (both contained in the dotted boxes), only the details of sequence generator 128 is shown. It will be noticed that the circuitry for actually producing the unscramble sequence is identical to the one for producing the scramble sequence in FIG. 3, and therefore the same members with primes added have been used in FIG. 5 to designate corresponding elements. Shift register 56' has associated with it N AND gates 62', which gates 62' have a state depending on the state or word in N-bit command register 60' (some of gates 62' are activated and some of the gates are inactivated). The input signal to register 56' is the AND of the activated gates 62' and of the clock signal from PLL 98, which is performed by N-input AND gate 64' and AND gate 58' respectively. This, is precisely the same as the operation in FIG. 3. Hence, if N-bit command register 60' has the same word in it at the receive unit as the one 60 at the transmitter, and the two shift registers 60 and 60' are synchronized to each other, they will both be producing the same output sequence. This means that the sequence produced at the receiver will be sufficient to unscramble the scrambled video received and create the proper signal using the circuit shown in FIG. 4. Synchronization is insured by having the all-one condition jammed into each element of N-bit shift register 56' by gate 102 at just the moment that all ones are produced at the transmitter (at least the delayed version of what the transmitter is doing, taking into account the satellite transmission delays). This is because the line which has its sync pulse omitted is the same as the TV line for which all ones occurred. Hence, when the missing sync is detected, that is the signal to insert all ones in N-bit shift register 56', and therefore register 56' will automatically be brought into synchronization with the transmitted signal. This also insures that, if the signal is out momentarily, register 56' can be pulled back into synchronization within a few seconds.

The contents of N-bit command register 60' are supplied in the following ways: Each hour video address generator 124 generates a new address each hour as outlined above. A list of n command words, each of which is N-bits long, is stored in ROM 132 and is associated with the video unscrambling sequence. Each time a new video address is generated by generator 124, ROM 132 is addressed with that address and the N-bit word corresponding to that address is fetched and latched into N-bit command register 60'. In other words, when the output of counter 100 produces a pulse to denote the start of the hour, the internal contents of the shift register of generator 124 changes to a new address. The address is somewhere between one and n. The contents of the address is ROM 132 list of command words is placed in command register 60'. The contents of N-bit command register 60' is what determines the sequence that will be produced for the next hour. The audio descramble sequence is produced in an identical manner by sequence generator 130, however with its own list of ROM words.

From the operations of the enable circuit one can also see the methodology with which the central computer computes the key for sending to the customer. The central computer has a video and audio address generator built into it (although this is in software rather than hardware). It has stored the address that it wants to start the customer address generators 124 and 126 off at, and, therefore, what the sequence of ROM words that will be inserted into the N-bit command register 60' (and its corresponding register in generator 130) will be. That is, in fact, how those words are inserted into the command registers at the transmitter. The whole object of the transmitter in sending the key is to see to it that at the start of the new month the right start address is inserted into the address generators 124 and 126. This insures that the sequence of addresses that it uses during the current month and the sequence of the addresses locally produced at the receivers will be the same.

The central computer function is twofold. The first is to generate two N-bit words every hour (one for video and one for audio) to be supplied to the scrambling sequence generators on leads 54 and 54a of FIG. 3, while the second is to generate, on command, a key word for any subscriber which is a function of the subscriber serial number and the time of day. This key word is such that it will allow the subscriber decoder (114 of FIG. 5) to generate the proper video start-word and audio start-word for the coming month.

Because the computer needs access to the "time" (kept synchronously by all the subscribers), the approximately 15 KHZ clock (at input 52 of FIG. 3) is fed into the computer to allow it to keep track of time. Alternatively, the 15 KHZ clock can be fed into a hardware counter register external to the computer, the contents of which can be read by the computer on demand.

Because the operation for audio and video keys are identical we shall just describe operation for video. To generate the N-bit video word every hour, the computer has the same list of n words (each of which is N-bits long) as is stored in ROM (132 of FIG. 5) in each subscriber terminal. Further, it operates in software a mirror image of the video address generator (124 of FIG. 5) in each subscriber terminal. Hence, each hour the video address generator is incremented, generates a new address (between 1 and n), fetches the N-bit word which is the contents of that address, and applies that N-bit word to input 54 of FIG. 3.

The video address generator (124 of FIG. 5) is a feedback shift register identical in operation to the circuit on the upper part of FIG. 3. It may be implemented in software by the following mathematical equations.

Let $x_i$ be the value of the left-most cell (binary) at time interval i (time counted in hours). Then $x_{i-j}$ is the contents of the cell that is j cells from the leftmost one at time i and was the contents of the leftmost cell j time units before. The entire operation is then descrambled by the equation to produce the contents of the leftmost cell at the next hour ($x_{i+1}$). The equation is:

$$x_{i+1} = \sum_{j=0}^{N-1} x_{i-j} a_j$$

All multiplications and additions are Boolean and the coefficients are selected from Appendix C of the book by Peterson.

The above describes how function 1 is implemented.

The description of how function 2 is performed follows: Each month the computer needs a new video start-word that will eventually be deposited in every subscriber's register (120 of FIG. 5). This may either be obtained by a random number generator, or for more safety, a specific employee of the firm operating the scrambling system will select a new word at random and secretly input it to the central computer. The algorithm the software used to generate the key depends on the algorithm implemented in decoder 114 of FIG. 5. Here the designer has a large choice. The decoder implements the equation VSW=f(clock, ser#, key) where VSW is a number representing the video start-word and f represents a mathematical manipulation (that the computer knows) on the three numbers clock, serial number and key.

At the time a key is requested, the computer knows that VSW it wants to convey and also the time and the serial number the key is to be sent to. It computes the key by the function. key=g(clock, ser #, VSW) where g is a mathematical manipulation of three nubmers: clock, serial#0 and VSW.

A trivial example of such a system is VSW=f(clock, ser#, key)=clock+serial #+key, key=g(clock, ser#, VSW)=VSW−clock−serial #.

The decoders implement the function f and the central computer implements the function g. This is not a particularly good f and g to use since a pirate having found out what f is, knows g and can generate keys for other subscribers at any time (This takes a very sophisticated pirate, however) What is desirable is an f and g such that even if a very diligent pirate discovers f, he does not know g. This can be accomplished through the use of public-key encryption. In this technique, knowing the method of encryption does not allow you to do decryption of the cipher text. In this application, the roles are reversed, f is thought of as an encryption technique (even though implemented at the decoder) and g is thought of as a decryption technique (even though implemented at the encoder). Even though a pirate may be able to discover how the function f works, he still does not know how the function g works.

An explanation of such public key systems, together with some specific algorithms and examples, is contained in the paper "A Method for Obtaining Digital Signatures and Public-Key Cryptosystems" by R. L. Rivest et. al. in Communications of the ACM, February 1978, Vol. 21, No. 2.

It will be appreciated that many other embodiments are possible within the spirit and scope of the invention. For example, the time window key system can be used with any scrambling system that requires a digital bit stream for decoding, such as random line permutation, random breaking, or combinations of all of these systems. Further, although described for use in satellite TV using FM, the system could used in cable and subscription services, or with vestigial sideband AM. Still further, the system shown is only one of many possible systems for having an acceptable key word depend upon the time of insertion.

For example, a technique for providing greater security for the circuit of FIG. 5 would be as follows. Instead of decoder 114 producing the video and audio start-words, it can produce a temporary video and audio start-words and load them into registers 120 and 122 respectively. The actual computation of the start-words is made just prior to the beginning of the month at an exact time that the central computer system has chosen in advance, but which is unknown to the circuitry of FIG. 5. When that time comes, the contents registers 120 and 122 are ANDed respectively with the contents of hour counter 104. The respective results are the starts-words loaded into registers 120 and 122 respectively. The command can be issued by skipping two successive sync pulses, which is detected by gate 102 using appropriate means. If this embodiment is used, the inhibit input to gate 46 is used to perform the double skipping and gate 58 must be inhibited for one pulse so that register 56 keeps synchronism with the corresponding register 56' in the decoder. The advantage of this embodiment is that the start-words reside in registers 120 and 122 for a short time, making piracy difficult.

What is claimed is:

1. Apparatus for decoding a scrambled television signal in which scrambling is accomplished by distorting the television signal at a first rate in synchronism with a television synchronizing rate and in a manner determined by a sequential logic signal derived from a sequential logic circuit, the feedback connections of which are established by a command word and which first feedback connections control the sequence of said sequential logic generator, but which television signal, in order to prevent unauthorized keyless decoding, does not include at said first rate any signal representative of the state of said distortion; said apparatus comprising:

controllable distortion correction means adapted to receive said scrambled television signal;

code-controlled sequential logic signal generating means coupled to said controllable distortion correction means and including second combinational logic circuit means for generating a sequential control signal at said first rate corresponding with said sequential logic signal and having a sequence established by controllable feedback connections of said combinational logic circuit corresponding with said first feedback connections;

time-of-day clock signal generating means;

distinguishing serial-number memory means for storing a serial-number signal uniquely distinguishing said apparatus from other similar apparatus;

code signal decoding means coupled to said time-of-day clock signal generating means, to said serial-number memory means, to a key word source and to said code-controlled sequential logic means for generating said code word from said time-of-day clock signal, said serial-number signal and from said key word so that said code word is identical to said command word only if said key word and said time of day are related.

2. Apparatus according to claim 1 wherein said scrambled television signal includes periodic decoder synchronizing signal, and wherein said code-controlled sequential logic signal generating means is reset to a standard condition upon each occurrence of said decoder synchronizing signals.

3. Apparatus according to claim 2 wherein said periodic decoder synchronizing signals are represented by periodic non-occurrence of horizontal synchronizing signals.

4. A method for decoding a scrambled television signal in which scrambling is accomplished by distorting the television signal at a first rate in synchronism with a television synchronizing rate and in a manner determined by a sequential logic signal derived from a sequential logic circuit, the feedback connections of which are established by a command word and which first feedback connections control the sequence of said sequential logic generator, but which television signal, in order to prevent unauthorized keyless decoding, does not include at said first rate any signal representative of the state of said distortion; said method comprising the steps of:

generating a time-of-day signal;

generating a serial-number signal;

generating a code word from said time-of-day signal, said serial-number signal, and from a key word so that said code word is identical to said command word only if said key word and said time of day are related;

generating a sequential logic signal from second combinational logic circuit means, said sequential logic signal being generated at said first rate and having a sequence established by controllable feedback connections of said second combinational logic circuit which connections are controlled by said code word; and correcting said distortion under the control of said sequential control signal.

* * * * *